(12) United States Patent
Hsieh et al.

(10) Patent No.: US 8,276,865 B2
(45) Date of Patent: Oct. 2, 2012

(54) HOLDING DEVICE

(75) Inventors: Ting-Fang Hsieh, Taipei (TW);
Chun-Wen Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 364 days.

(21) Appl. No.: 12/650,317

(22) Filed: Dec. 30, 2009

(65) Prior Publication Data
US 2010/0181451 A1    Jul. 22, 2010

(30) Foreign Application Priority Data

Jan. 22, 2009   (TW) ................................ 98102550 A

(51) Int. Cl.
*A47F 5/00* (2006.01)
(52) U.S. Cl. ................ 248/288.11; 248/205.1; 248/682; 248/292.12; 248/274.1; 248/309.1; 379/454; 379/455; 455/575.1
(58) Field of Classification Search ............. 248/288.11, 248/292.12, 371, 372.1, 396, 407, 176.1, 248/176.3, 205.5, 220.21, 274.1, 276.1, 309.1, 248/309.3, 205.1, 682, 205.8, 278.1; 455/575.1; 379/454, 455
See application file for complete search history.

(56) References Cited

U.S. PATENT DOCUMENTS

| 7,735,791 B2 * | 6/2010 | Bury .......................... 248/205.5 |
| 7,753,330 B2 * | 7/2010 | Brief ......................... 248/278.1 |
| 2009/0127411 A1 * | 5/2009 | Aguilar ...................... 248/205.8 |

FOREIGN PATENT DOCUMENTS

| CN | 1477442 | 2/2004 |
| EP | 1768082 A1 | 3/2007 |
| TW | 435371 | 5/2001 |
| TW | M301804 | 12/2006 |
| TW | M310862 | 5/2007 |
| TW | I295979 | 4/2008 |

* cited by examiner

*Primary Examiner* — Amy Sterling
*Assistant Examiner* — Todd M Epps
(74) *Attorney, Agent, or Firm* — Muncy, Geissler, Olds & Lowe, PLLC

(57) ABSTRACT

A holding device includes a holder, a connecting body, and a base. The base has a first meshing portion. The connecting body is disposed between the holder and the base, and it has a pivotal element, a limiting portion, and a second meshing portion. The second meshing portion is disposed on the limiting portion. Two ends of a surface of the pivotal element are pivotally connected with the base and the limiting portion, respectively, and thus the base and the limiting portion may rotate relative to the pivotal element. When the limiting portion rotates relative to the pivotal element, the second meshing portion is meshed with or detached from the first meshing portion.

7 Claims, 5 Drawing Sheets

HOLDING DEVICE

RELATED APPLICATIONS

This application claims priority to Taiwan Application Serial No. 98102550, filed Jan. 22, 2009, which is herein incorporated by reference.

BACKGROUND OF THE INVENTION

1. Field of the Invention

The invention relates to a holding device and, more particularly, to a vehicular holding device.

2. Description of the Related Art

A conventional vehicular bracket for putting a portable electronic device (such as a global positioning system (GPS) device) mainly has a support arm, a base, and a holder. The support arm is pivotally connected with the base and the holder via rotating shafts to conveniently adjust an angle between the support arm and the base or an angle between the support arm the holder. When a driver wants to adjust the vehicular bracket in driving, he or she adjusts the angle between the support arm and the base or the angle between the support arm and the holder by moving the support arm, the base and the holder relatively. When the vehicular bracket is adjusted to be at a proper angle, a fixing knob on the rotating shaft is utilized to fix the present usage angle of a vehicular holding device. As a result, the driver may easily watch or use the portable electronic device on the vehicle holding device.

Due to the structure design of a conventional vehicle bracket, when a common user adjusts the vehicular bracket to a usage angle, he or she usually needs to adjust the support arm of the vehicle bracket to be at a proper usage angle with one hand, and then he or she operates the fixing knob of the vehicle bracket with the other hand to tighten the support arm on the base or the holder to make the vehicular bracket accurately rotate to an expected angle. However, to a user who cannot operate the vehicular bracket with two hands at the same time such as the driver in driving, it may be inconvenient and unsafe.

BRIEF SUMMARY OF THE INVENTION

The invention provides a holding device, a user may operate a usage angle of the holding device without using his or her two hands at the same time, and thus the user may operate the holding device more conveniently.

According to an embodiment of the invention, the holding device includes a holder, a base, and a connecting body. The base has a first meshing portion. The connecting body is disposed between the holder and the base, and it includes a pivotal element, a limiting portion, and a second meshing portion. An end of the pivotal element is pivotally connected with the base to allow the base to rotate. The limiting portion is pivotally connected with the other end of the pivotal element. The second meshing portion is disposed on the limiting portion and suited for being fastened with the first meshing portion. The limiting portion rotates relative to the base via the pivotal element to be fastened to or detached from the second meshing portion.

As a result, according to the holding device of the invention, the user may adjust the angle between the connecting body and the base and fix the relative position between the connecting body and the base with a single hand by operating the limiting portion, and thus the method of operating the usage angle of the holding device is simplified.

Additionally, the connecting body includes an upper housing and a lower housing. The upper housing is covered and combined with a lower housing to form an accommodation space, and the pivotal element, the limiting portion or the limiting element may be hidden in the accommodation space to show compact and simple appearance. Thus, the user are more willing to buy the holding device.

These and other features, aspects and advantages of the present invention will become better understood with regard to the following description, appended claims, and accompanying drawings.

DETAILED DESCRIPTION OF THE EMBODIMENTS

Figure 1:
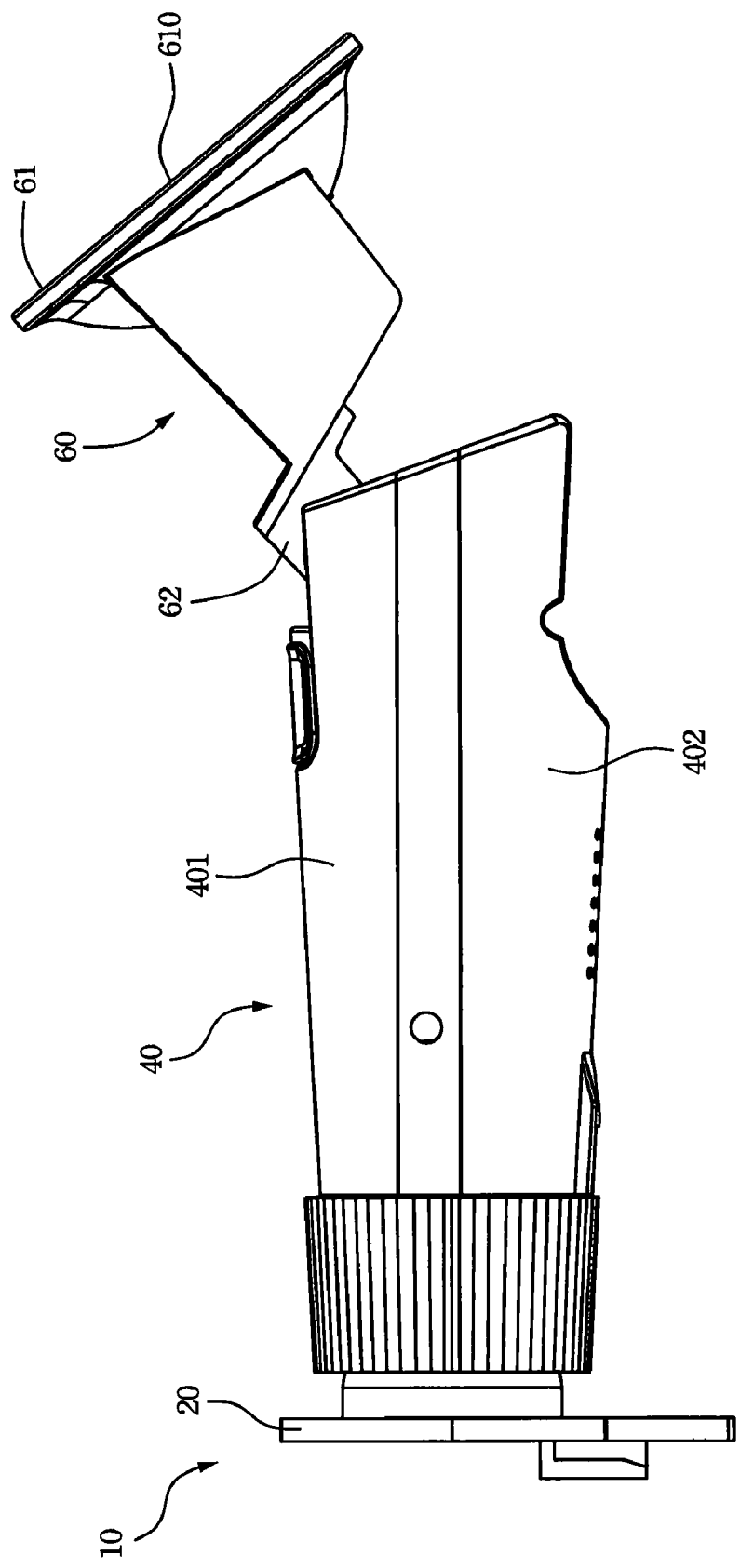
FIG. 1 is a schematic diagram showing the appearance of a holding device according to an embodiment of the invention.

FIG. 1 is a schematic diagram showing the appearance of a holding device according to an embodiment of the invention. The invention provides a holding device 10 including a holder 20, a connecting body 40, and a base 60. The connecting body 40 is connected between the holder 20 and the base 60, and an end of the base 60 is pivotally disposed on the connecting body 40 to allow the base 60 to rotate relative to the connecting body 40.

Figure 2:
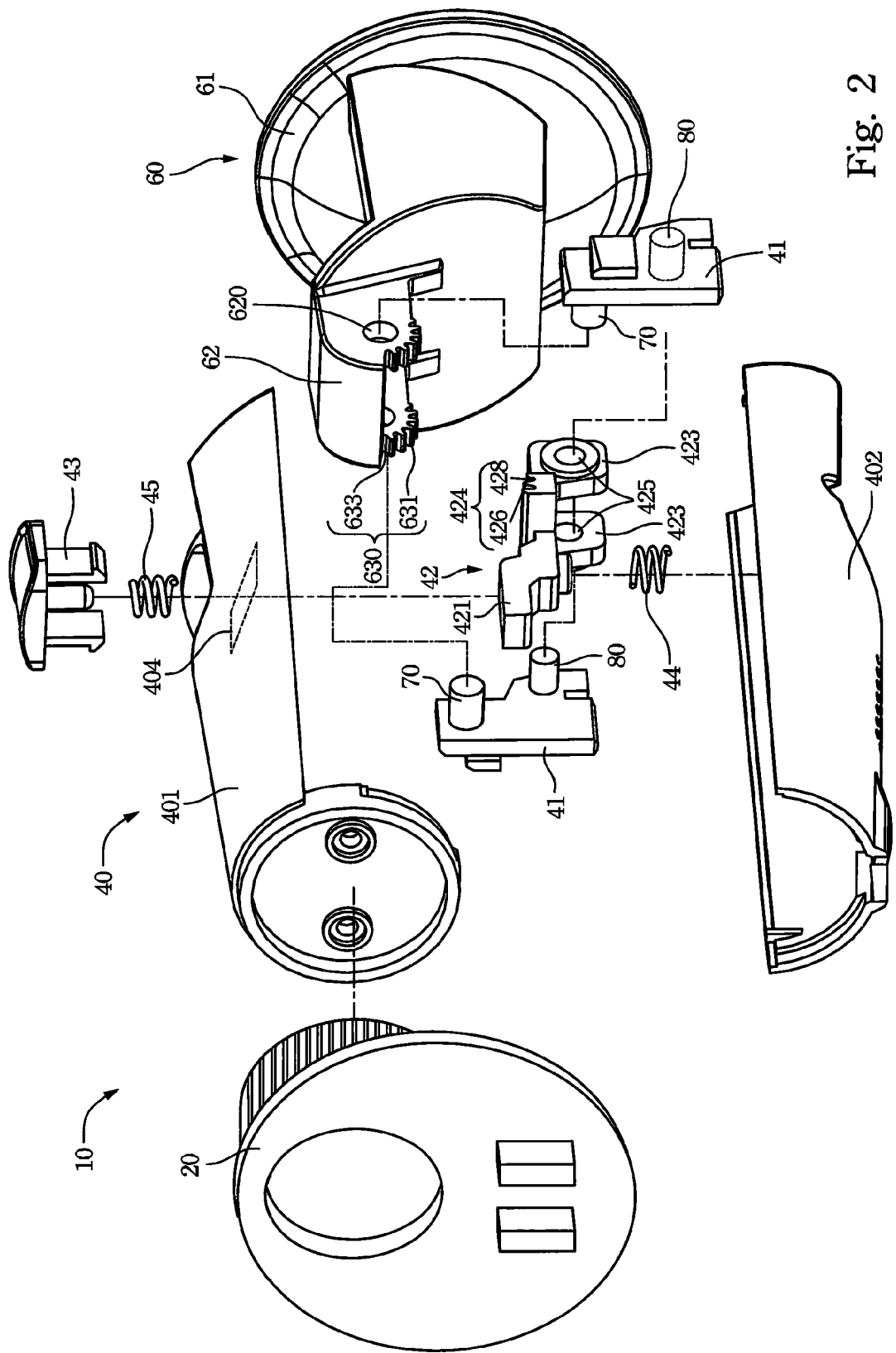
FIG. 2 is an exploded diagram showing a holding device according to a first embodiment of the invention.

FIG. 2 is an exploded diagram showing a holding device according to a first embodiment of the invention. As shown in FIG. 1 and FIG. 2, the connecting body 40 includes an upper housing 401 and a lower housing 402, and the upper housing 401 may be covered and combined with the lower housing 402. Additionally, the connecting body 40 further has two pivotal elements 41, a limiting portion 42, a first elastic element 44, a release element 43, and a second elastic element 45. The release element 43 is disposed in an opening 404 of the upper housing 401, and an end of the release element 43 may be directly or indirectly connected with the limiting portion 42. The release element 43 may be pressed to push the limiting portion 42. The second elastic element 45 is disposed between the opening 404 and the release element 43 to make the release element 43 back to original position of the release element 43 via the resilience of the second elastic element 45 after the release element 43 is pressed.

The limiting portion 42 is located in the connecting body 40 (that is, between the upper housing 401 and the lower housing 402), an end of the limiting portion 42 is pivotally disposed between the two pivotal elements 41 to rotate around an axis, and the axis may be an axis connecting two second pivotal portions 80. A second meshing portion 424 is disposed on the limiting portion 42, and the second meshing portion 424 may face a first meshing portion 630 disposed on the base 60.

The first elastic element 44 is disposed between the limiting portion 42 and the lower housing 402. The first elastic element 44 has the resilience making the limiting portion 42 rotate toward the upper housing 401, and the resilience can make the second meshing portion 424 on the limiting portion 42 and the first meshing portion 630 meshed with each other to prevent the connecting body 40 from rotating relative to the base 60.

In detail, the base 60 includes a plate 61 and a first extension portion 62. A side of the plate 61 is attached to a plane surface (such as a windshield not shown in FIG. 1 and FIG. 2) via a sucker 610. The first extension portion 62 is disposed at a side of the base 60 adjacent to the connecting body 40, the outline of the first extension portion 62 is arc-shaped, and the first extension portion 62 has a through hole 620. A first pivotal portion 70 disposed at each of the pivotal elements 41 is inserted in the through hole 620, and thus the first extension portion 62 is pivotally disposed between the two pivotal elements 41. Consequently, the base 60 may rotate around another axis, and the axis is an axis connecting the two first pivotal portions 70 to realize a pivotal structure allowing the base 60 to rotate relative to the connecting body 40.

The first meshing portion 630 is located on a curved surface with an arc structure of the first extension portion 62, a plurality of first protrusion teeth 631 and first dents 633 are arranged on the first meshing portion 630, and the first dent 633 is located between any two first protrusion teeth 631. The first meshing portion 630 may be integrated with the first extension portion 62 or detachably disposed on the first extension portion 62.

Moreover, the limiting portion 42 further has a sheet member 421, and the second meshing portion 424 and two second extension portions 423 are disposed on the sheet member 421. Each of the second extension portions 423 has a through hole 425, and a second pivotal portion 80 at the other end of the pivotal element 41 passes through the through hole 425 to realize a pivotal structure allowing the limiting portion 42 to rotate relative to the pivotal element 41. The second meshing portion 424 also has a plurality of second protrusion teeth 426 and second dents 428, and the second dent 428 is located between any two of the second protrusion teeth 426.

The holder 20 is used for supporting a portable electronic device (not shown), and the portable electronic device may be a mobile phone, a personal digital assistant (PDA) device, or a GPS device. The holder 20 may be directly or indirectly pivotally disposed at an end of the connecting body 40 to adjust the portable electronic device to a preferred angle.

Figure 3:
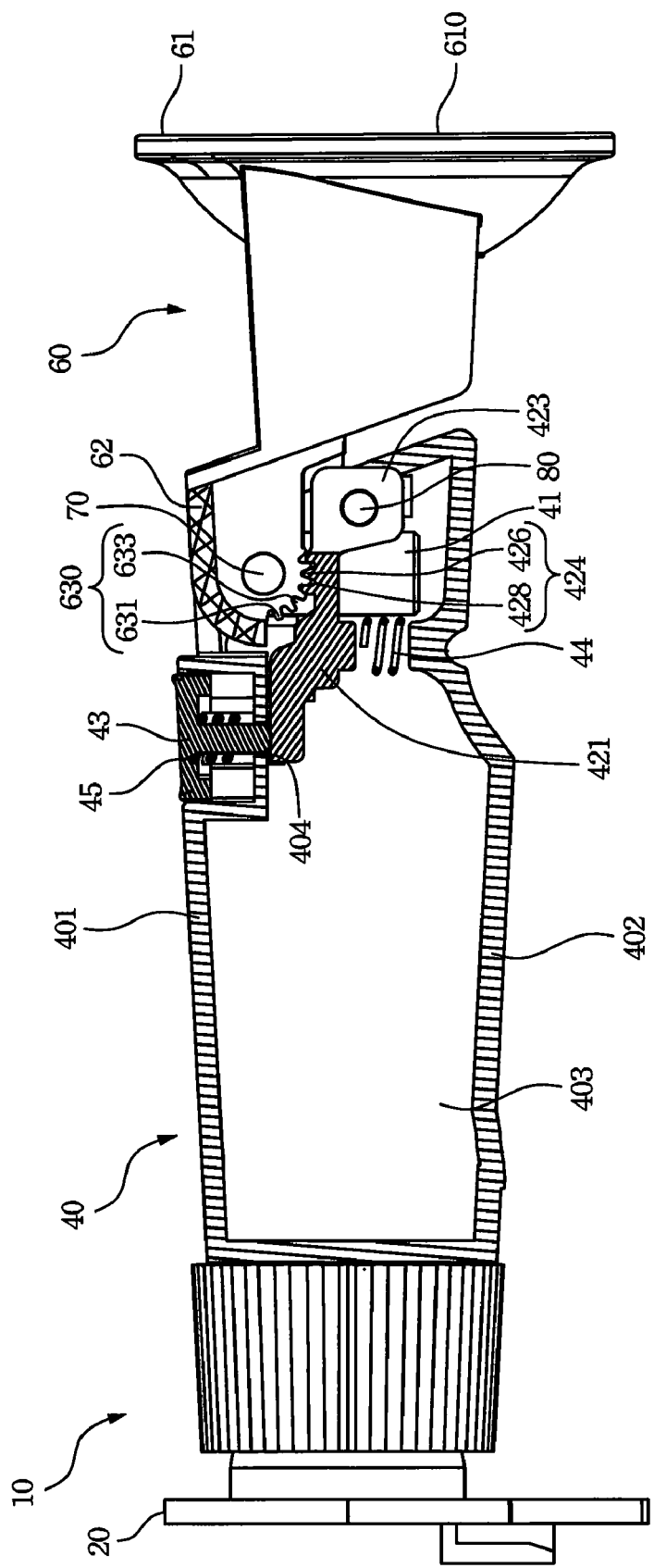
FIG. 3 and FIG. 4 are sectional views showing the holding device according to the first embodiment of the invention.
Figure 4:
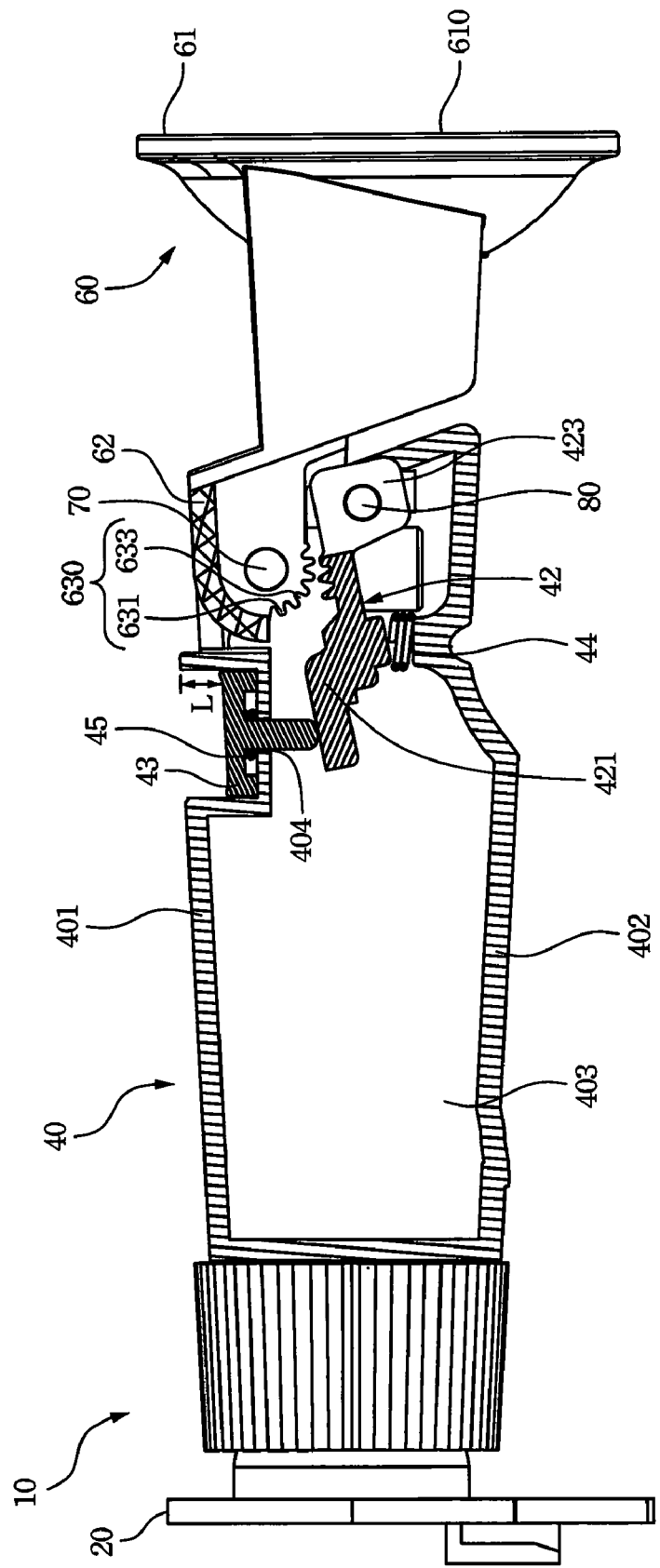

FIG. 3 and FIG. 4 are sectional views showing the holding device according to the first embodiment of the invention. The second meshing portion 424 and the first meshing portion 630 are meshed with each other in FIG. 3. The second meshing portion 424 is detached from the first meshing portion 630 in FIG. 4. As shown in FIG. 3 and FIG. 4, since the pivotal elements 41 are pivotally connected with the base 60 and the limiting portion 42, respectively, the base 60 and the limiting portion 42 may rotate relative to the pivotal elements 41. That is, the base 60 may rotate around the axis connecting the two first pivotal portions 70 to conveniently adjust different usage angles between the base 60 and the connecting body 40. The second pivotal portion 80 is inserted in the second extension portions 423 of the sheet member 421 to allow the limiting portion 42 to rotate around the axis connecting with the two second pivotal portions 80. The second meshing portion 424 may be meshed with or detached from the first meshing portion 630 to adjust the relative position between the limiting portion 42 and the base 60 via the connection relationship.

As a result, when an external force is applied on the release element 43 along a reciprocating path L, the release element 43 pushes the sheet member 421 to rotate toward a first direction (such as anticlockwise direction). At that moment, the second protrusion teeth 426 of the second meshing portion 424 are detached from the first dents 633 of the first meshing portion 630. Consequently, the connecting body 40 or the base 60 may be randomly rotated relative to the other (as shown in FIG. 4) and adjusted to be at an optimum usage angle.

On the contrary, when the external force is disappeared (as shown in FIG. 3), the release element 43 is pushed to its original position by the resilience of the second elastic element 45. At the time, the sheet member 421 is driven to rotate toward a second direction (such as clockwise direction) which is the reverse direction of the first direction by the resilience of the first elastic element 44. When the sheet member 421 is against the base 60, the second protrusion teeth 426 of the second meshing portion 424 are meshed with the first dents 633 again to make the second meshing portion 424 and the first meshing portion 630 firmly connected with each other to prevent the connecting body 40 or the base 60 from relatively rotating, and thus the usage angle between the base 60 and the connecting body 40 is fixed (as shown in FIG. 3).

Figure 5:
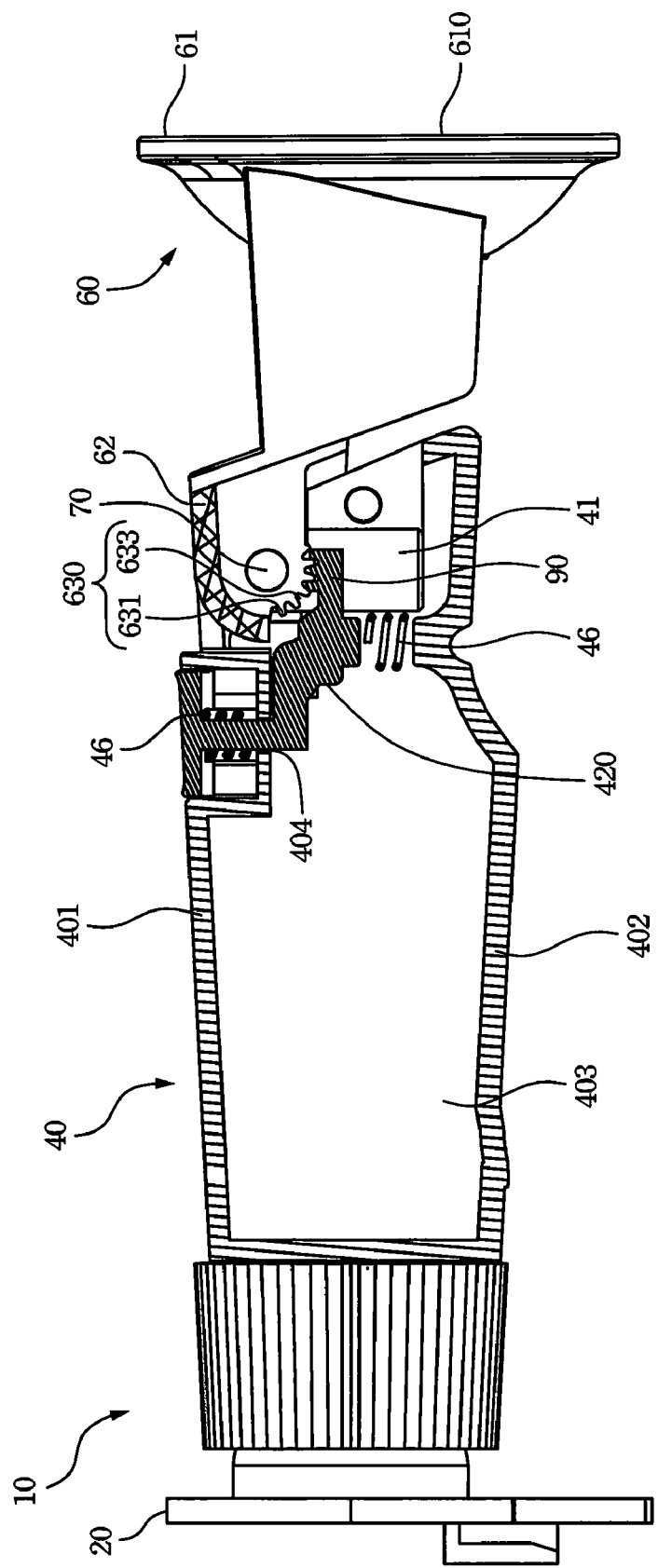
FIG. 5 is a partial sectional view showing a holding device according to a second embodiment of the invention.

FIG. 5 is a partial sectional view showing a holding device according to a second embodiment of the invention. In the second embodiment, the connecting body 40 has a limiting element 420 which may replace the limiting portion 42 and the release element 43 in the first embodiment. An end of the limiting element 420 is exposed from the surface of the upper housing 401, and the other end passes through the opening 404 to be disposed in the connecting body 40. The limiting element 420 has a third meshing portion 90 (such as a gear member with a gear characteristic). The third meshing portion 90 is located on the surface of the limiting element 420 facing the first meshing portion 630. The limiting element 420 further includes two third elastic elements 46, and the third elastic elements 46 are against the limiting element 420 and the upper housing 401 and against the limiting element 42 and the lower housing 402 to make the third meshing portion 90 and the first meshing portion 630 meshed with each other and an end of the limiting element 420 expose from the surface of the upper housing 401. When the external force is applied to the limiting element 420, the limiting element 420 is driven to be away from the base 60, and the third meshing portion 90 is not meshed with the first meshing portion 630 any more. As a result, the connecting body 40 or the base 60 may be randomly rotated relative to each other and adjusted to the optimum usage angle (as shown in FIG. 4).

As a result, the holding device 10 according to the invention is a vehicular bracket for supporting a portable electronic device, and the driver may hold the connecting body 40 with a single hand and press the release element 43 with his or her thumb. When the second meshing portion 424 (or the third meshing portion 90) is not meshed with the first meshing portion 630 any more, the driver may rotate the connecting body 40 relative to the base 60. After he or she adjusts to obtain a proper usage angle, he or she releases the release element 43 or the limiting element 420 to make the base 60 and the connecting body 40 incapable of rotating to maintain the adjusted usage angle. As a result, the driver may adjust the usage angle of the holding device according to the invention with his or her single hand, he or she does not need to free his or her two hands at the same time, and thus the inconvenience and safe problems in driving are reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A holding device, comprising:
   a holder;
   a base including a first meshing portion; and
   a connecting body disposed between the holder and the base, wherein the connecting body includes:
   a limiting portion;
   a pivotal element comprising:
   a first pivotal portion pivotally disposed to the base; and
   a second pivotal portion pivotally disposed with the limiting portion, and being non-coaxial to the first pivotal portion; and
   a second meshing portion disposed on the limiting portion and suited for being detachably fastened with the first meshing portion,
   wherein when the first meshing portion is fastened to the second meshing portion, an usage angle between the base and the connecting body is fixed,
   when the first meshing portion is detached from the second meshing portion, the base is capable of rotating relative to the connecting body.

2. The holding device according to claim 1, wherein the base comprises:
   a plate fixed on a plane surface; and
   a first extension portion located at a side of the base adjacent to the connecting body and connected with the pivotal element, wherein the first meshing portion is located at the first extension portion.

3. The holding device according to claim 2, wherein the limiting portion comprises:
   a second extension portion located at an end of the limiting portion and connected with the pivotal element.

4. The holding device according to claim 1, wherein the connecting body further comprises a first elastic element, and the first elastic element is against between the limiting portion and the connecting body.

5. The holding device according to claim 1, wherein the connecting body further comprises:
   an opening formed on a surface of the connecting body;
   a release element movably disposed at the opening, wherein an end of the release element is connected with the limiting portion; and
   a second elastic element against between the release element and the connecting body.

6. The holding device according to claim 2, wherein the connecting body comprises an upper housing and a lower housing, the upper housing is covered or combined with the lower housing to form an accommodation space, and the accommodation space accommodates the pivotal element, the limiting portion, and the first extension portion.

7. The holding device according to claim 5, wherein the release element is integrated with the limiting portion.

* * * * *